(No Model.) 3 Sheets—Sheet 1.

M. WOODHULL.
VEHICLE BODY.

No. 551,703. Patented Dec. 17, 1895.

WITNESSES:
Frank M. Burnham.
Chas. I. Welch.

INVENTOR
Morris Woodhull
BY
ATTORNEY (No Model.) 3 Sheets—Sheet 2.
M. WOODHULL.
VEHICLE BODY.
No. 551,703. Patented Dec. 17, 1895.
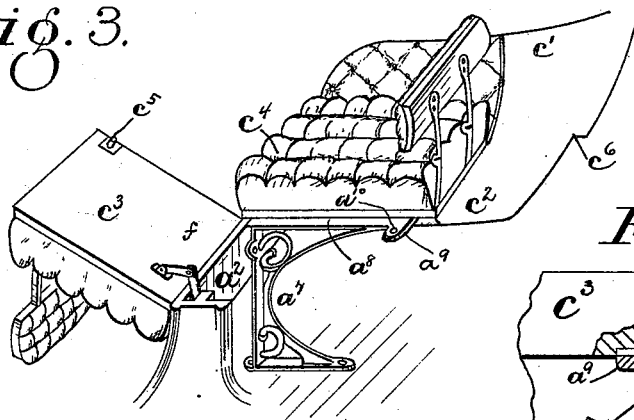
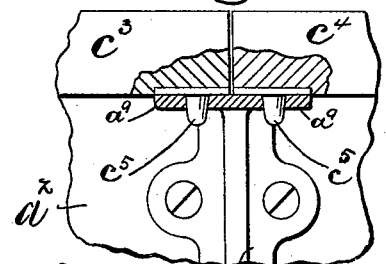
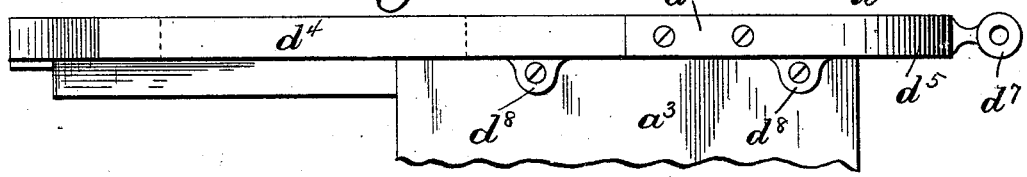
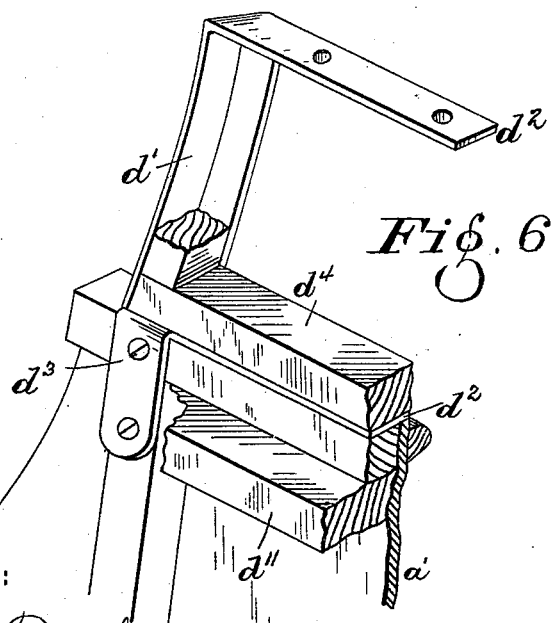
WITNESSES:
Frank M Burnham
Chas. I. Welch
INVENTOR
Morris Woodhull
BY
ATTORNEY (No Model.) 3 Sheets—Sheet 3.

M. WOODHULL.
VEHICLE BODY.

No. 551,703. Patented Dec. 17, 1895.

WITNESSES:
Frank M. Burnham.
Chas. I. Welch

INVENTOR
Morris Woodhull
BY
ATTORNEY.

UNITED STATES PATENT OFFICE.

MORRIS WOODHULL, OF DAYTON, OHIO.

VEHICLE-BODY.

SPECIFICATION forming part of Letters Patent No. 551,703, dated December 17, 1895.

Application filed February 4, 1895. Serial No. 537,244. (No model.)

*To all whom it may concern:*

Be it known that I, MORRIS WOODHULL, a citizen of the United States, residing at Dayton, in the county of Montgomery and State of Ohio, have invented certain new and useful Improvements in Vehicle-Bodies, of which the following is a specification.

My invention relates to improvements in that class of vehicles in which the seats, instead of being stationary, are of a movable character, so that they can be arranged in different positions to present either a single or double seated vehicle, the construction being such that it shall embody features common to what are known as "surreys," and at the same time being capable of adjustment to form what is known as a "trap."

The object of my invention is to provide such a vehicle in which the arrangement of the seats permits of the change from a single to a double seated vehicle without disturbing or changing the position of the forward seat.

A further object of my invention is to provide a construction of a novel character by which ready access may be obtained to the rear seat.

A further object of my invention is to provide such a construction and arrangement of parts that ample leg-room shall be provided on the rear seat, when used as a two-seated vehicle, without unduly extending the body so as to make it objectionable as a single-seated vehicle.

A further object of my invention is to provide a novel construction of the side arms or rails in connection with the devices for securing the top.

I attain these objects by the constructions shown in the accompanying drawings, in which—

Figure 1:
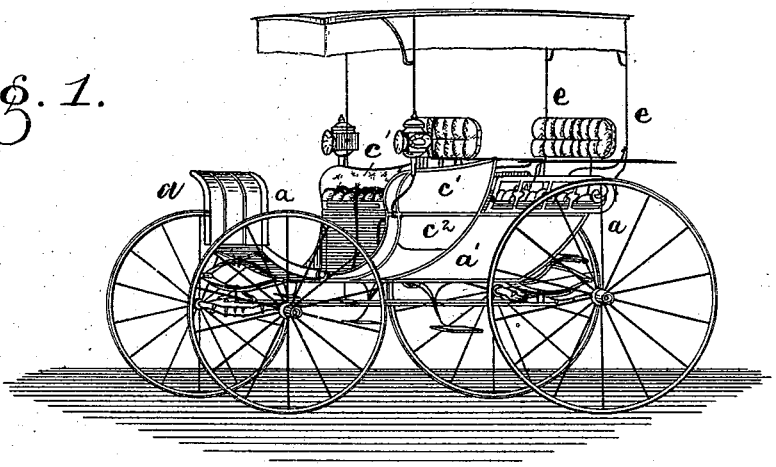
Figure 2:
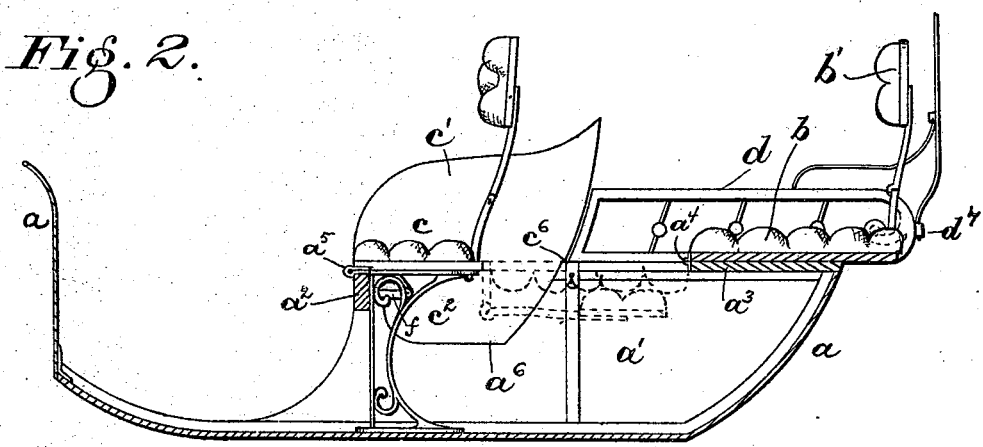
Figure 7:
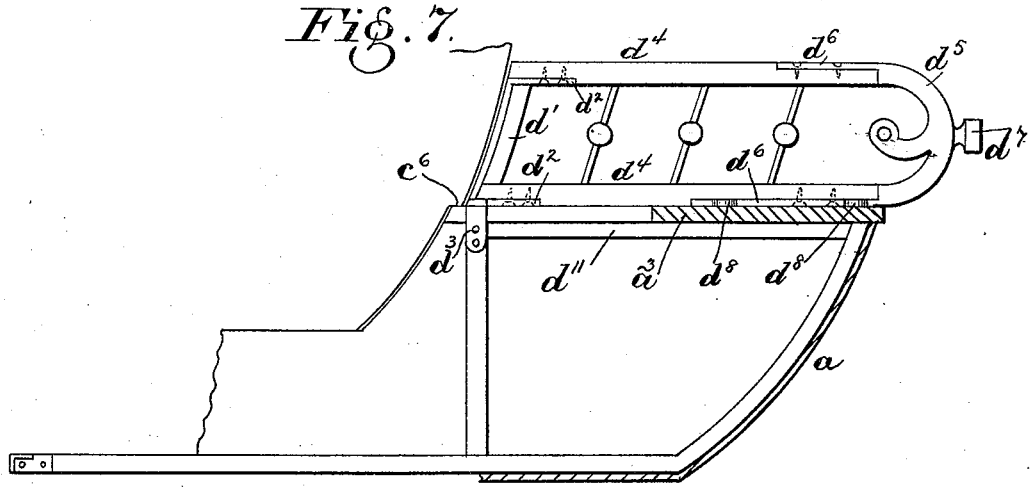
Figure 8:
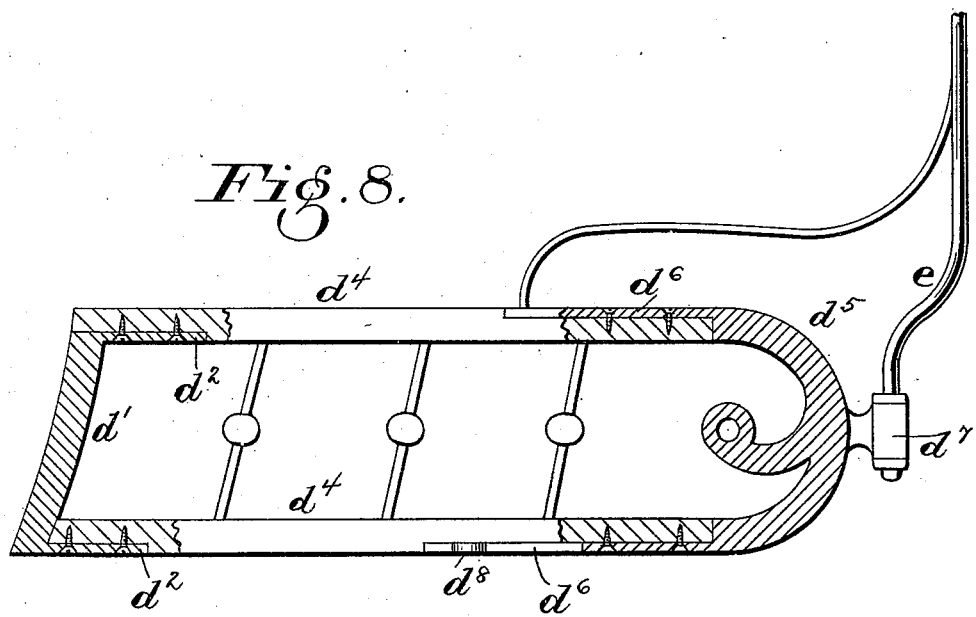

Figure 1 is a perspective view of a vehicle embodying my invention. Fig. 2 is a longitudinal sectional view of the body of the same showing the seats adjusted as a double-seated vehicle, with the rear seat shown in dotted lines in a folded position. Fig. 3 is a perspective view of the front seat, showing the devices for supporting the same while permitting the turning of the seat to afford access to the rear seat. Fig. 4 is a detail view of a portion of the same. Fig. 5 is a plan view of a portion of the rear seat and a side rail. Fig. 6 is a detail view in perspective of a portion of the side arm or rail of the rear seat. Fig. 7 is a sectional elevation of a portion of the rear part of the body; and Fig. 8 is a side elevation, partly in section, of the side arm or rail thereof.

Like parts are represented by similar letters of reference in the several views.

In the said drawings, $a\ a$ represent the body, which may be of any desirable conformation, the side panels $a'$ thereof being connected together at the front by a bar $a^2$, which extends from one side to the other and is rigidly secured at each end to the said side panels $a'$. The body is decked over at the top for a short distance, beginning at the rear and extending forward. To this deck $a^3$ is hinged a rear seat $b$, in such a manner that when the seat is in position for use the bottom of it rests on top of the deck $a^3$ and slightly overhangs the same, as shown in Fig. 2. A lazy-back $b'$ is hinged to the rear seat and is adapted to fold downwardly in the ordinary manner so that the entire seat and lazy-back may be turned on the hinges $a^4$ and thus close up the space between the front of the deck $a^3$ and the rear portion of the front seat $c$, the bottom of the rear seat $b$ being then adapted to form a continuation of the deck $a^3$.

The front seat $c$ is hinged to the bar $a^2$, as shown at $a^5$, and to each end of the front seat is secured a side panel $c'$, which is extended above and to the rear of the said seat, as shown in Fig. 2, and also in the rear of said seat extended downwardly, as shown at $c^2$, so as to close the opening $a^6$ formed in the side of the body adjacent to the end of and partly in the rear of the front seat $c$. This extension $c^2$ of the panel $c'$ constitutes, when the seat is in its proper position, a part of the side panel $a'$, and is adapted to support one end of the seat $c$. When the forward seat $c$ is turned on its hinges $a^5$, this extension $c^2$ is raised and leaves the opening $a^6$ in the panel $a'$ through which access to the rear seat may readily be obtained.

To provide for easy access to the rear seat from either side of the vehicle without necessitating the disturbance of all the occupants of the front seat, I preferably form the front seat $c$ in two parts $c^3$ and $c^4$, as shown in Figs. 2 and 3, so that one-half only of the seat may be raised to open the side panels $a'$.

To provide for securely supporting the respective sections of the front seat when made in two parts, and as an additional support for the sustaining-bar $a^2$, I employ a stationary bracket $a^7$, which is secured to the bottom of the vehicle-body and also to said bar $a^2$, said bracket being provided with an extended arm $a^8$, having laterally-projecting lugs $a^9$, which stand opposite the divisional line of said seat-sections, so that the inner end of each rests on said arm $a^8$, which forms a rigid support therefor. Each of said seat-sections is further provided with a stay-pin $c^5$, adapted, when the section is in its normal position, to enter an opening $a^{10}$ in the lug $a^9$, and thus hold said seat firmly against lateral movement. (See Figs. 3 and 4.)

It will be understood that the side panels $c'$, connected to the respective sections of the front seat, constitute the ends of said seat, and may be upholstered opposite the seat proper to correspond to the upholstery of said seat. These side panels $c'$ extend a considerable distance in the rear of the seat proper so that it presents from the outside the appearance of a very deep seat, so that the portion in the rear of said panels does not appear of undue length when the rear seat is folded. This panel $c'$ is preferably extended slightly to the rear of the extension $c^2$ so as to form a shoulder $c^6$, adapted to rest on top of the side panel $a'$ and thus obviate the necessity of a close fit between the extension $c^2$ and the opening $a^6$ of the side panel. In the rear of these seat ends $c'$, and substantially in line therewith, are side rails or arms $d$, which are secured stationarily to the side panels $a'$ or the deck $a^3$ and form the ends or arms for the rear seat $b$ when the same is in an operative position. These arms or rails $d$, I construct in a novel manner so as to form thereby a support for the rear top posts $e$. Each of the arms consist of a front standard $d'$ which is formed of metal, preferably of an L-shape in section, and is provided with backwardly-projecting plates $d^2$ at the top and bottom and a downwardly-projecting lug or finger $d^3$, which is joined to the lower side plate on the side so as to extend downwardly along the side panel and be connected thereto. These plates $d^2$ serve to secure the rails $d^4$, which are made of wood. A rear support $d^5$, also of metal, is formed with forwardly-projecting plates $d^6$, also adapted to be secured at the ends to the rails $d^4$. This support $d^5$ is further provided with a boss or sleeve $d^7$ at the extremity of the same, and the lower plate $d^6$ is provided with projecting ears $d^8$. The ears $d^8$ serve to receive retaining screws or bolts, by means of which the arm or rail proper is secured to the deck $a^3$, as shown in Fig. 5, while the boss or sleeve $d^7$ is adapted to receive the end of the rear top post $e$, as shown in Figs. 2 and 8. When finished and painted the metal portions $d'$ and $d^5$ at the front and rear of the rails $d$ are not distinguished from the wooden portions, as they are all finished alike. The result is that the rails have a light appearance and also at the same time are sufficiently strong to support the rear top posts $e$ $e$. The rails are extended slightly beyond the rear end of the body $a$ $a$, to provide for the proper extension rearwardly of the top over the rear seat $b$ when in the operative position. When folded the rear seat is adapted to rest on the projecting sills or ridges $d^{11}$, which are extended under the deck $a^3$ in the usual manner.

By the arrangement thus described I form a vehicle which is simple, yet very strong in its construction. It is capable of being readily adjusted from a single to a double seated vehicle, and its constructions are such that it partakes both of the nature of a surrey and of a trap.

By having the front seat hinged to a stationary bar, which is immediately under the bottom of said seat, which bar is supported by a stationary bracket, a very strong construction is secured. By having an opening $a^6$ in the side panel, adapted to be closed by an extension on the seat, which is in fact a portion of the side panel when in use, I am enabled to form an opening for ready access to the rear seat without materially cutting away and thus destroying the strength of said side panel. At the same time, by the arrangement of the seat hinged at or near the top of the side panel, with a portion of the side panel connected directly thereto, the opening in the side panel is adapted to be closed so as to present, to all intents and purposes, a solid side panel.

Any suitable means may be provided for limiting the forward movement of the front seat when turned to admit passengers. I have shown a jointed bar $f$, hinged to each seat-section and to the cross-bar $a^2$ for this purpose. This jointed connection is adapted to fold under the seat when in its normal position, as shown in Fig. 2.

Having thus described my invention, I claim—

1. In a vehicle, the front seat hinged at or near the top of the side panels and having a portion of said side panels secured to the bottom of said seat so as to form an opening in each of said side panels when the seat is raised, seat arms or panels projecting above said seat also secured thereto, said seat arms or panels being extended to the rear of the body panels and adapted to rest on top of said body panels to form a support therefor independent of the extended portions of said panels, substantially as specified.

2. In a vehicle body, of a cross bar connecting the same at or near the front, a front seat made in sections and hinged to said cross bar, a bracket arm connected to said cross bar and to the floor of the vehicle body, said bracket arm having projections adapted to extend under and support the inner side of said seat sections, and pins on said seat to engage in openings in said bracket arm, substantially as specified.

In testimony whereof I have hereunto set my hand this 1st day of February, A. D. 1895.

MORRIS WOODHULL.

Witnesses:
W. P. MAXSON,
J. C. TYSON.